United States Patent Office 2,765,294
Patented Oct. 2, 1956

2,765,294

POLYAMIDES CONTAINING TERTIARY AMINOMETHYL GROUPS

David Charles England, Wilmington, Del., assignor to E. I. du Pont de Nemours and Company, Wilmington, Del., a corporation of Delaware No Drawing. Application June 29, 1953, Serial No. 364,945

15 Claims. (Cl. 260—78)

This invention relates to polymeric materials and to the preparation of same and, more particularly, to polyamides.

Improvement of the dyeing properties of polyamides, especially of the nylon type, e. g., the poly-(hexamethyleneadipamide) type, with acid dyestuffs has been a continual objective since these polyamides became commercially important. Efforts to attain this objective have taken two directions, namely, (1) through basification of the polymer by way of addition of basic end group stabilizers, and (2) copolymerization with materials which introduce hydrophilic groups into the polymer. Neither of these solutions has proved entirely satisfactory. The first, because the amount of basicity which can be introduced without sacrifice in molecular weight and spinning performance, is limited. The second, because the resulting polymers have had unsatisfactory thermal stability or because dyed products made therefrom have had unsatisfactory wash-fastness.

An object of the present invention is to provide a new class of polyamides and a process of preparing same. A further object is to provide new polyamides having excellent acid dyestuffs receptivity coupled with good thermal stability and spinning performance. A further object is to provide a new method of introducing basicity into polyamides in sufficient amount to give good acid dyestuffs receptivity without deleterious effect on the polyamides otherwise. Other objects of the invention will be apparent from the description given hereinafter.

The above objects are accomplished according to the present invention by providing a polyamide formed by the condensation polymerization of a polyamide-forming composition comprising a 2-tertiary-aminomethyl-5-methyl-1,6-hexanediamine.

The invention further comprises the preparation of polyamides by heating under condensation reaction conditions a polyamide-forming composition comprising a dibasic carboxylic acid or an amide-forming derivative thereof and at least 1 mole percent of the total polyamine reactants of a 2-tertiary-aminomethyl-5-methyl-1,6-hexanediamine. The term "dibasic carboxylic acid" is used throughout the specification and claims to designate not only the acid but also its amide-forming derivatives such as the ester, half-ester, anhydride, or amide, these being well-known equivalents of the acid in the formation of polyamides.

The polyamide-forming composition can consist solely of a dibasic carboxylic acid and a polyamine of the aforementioned type or it can contain in addition to these essential components polymer-forming diamines, glycols, and aminocarboxylic acids, or polyamide-forming derivatives thereof. On hydrolysis with hydrochloric acid, these polyamides yield amine hydrochlorides and dibasic acids as major products. For example, when the polyamide is made by heating under condensation reaction conditions a polyamide-forming composition comprising adipic acid as the dicarboxylic acid and 2-dimethylaminomethyl-5-methyl-1,6-hexanediamine as the tertiary amino-nitrogen, there is obtained upon hydrolysis of the polyamide with hydrochloric acid the hydrochloride of 2-dimethylaminomethyl-5-methyl-1,6-hexanediamine.

In the preferred practice for preparing the polyamides of this invention, substantially stoichiometrically equivalent amounts of the desired polyamines and dibasic acids are heated in the absence of a solvent (fusion method), or in the presence of a solvent (solution method) at a temperature which is generally in the range of 175° C. to 300° C. and, preferably, in the range of 225° C. to 290° C. until a polyamide of the desired properties is formed. The polymerization reaction generally involves formation of water, alcohol, phenol, or the like, depending upon the derivative of the dibasic acid or polyamine used.

It has been discovered that through the use of a polyamine as characterized above sufficient basicity may be introduced into a polyamide to give excellent receptivity for acid dyestuffs without having disadvantageous effect on the polyamide. Thus, it is possible to provide polyamides with markedly improved dye receptivity together with good thermal stability and spinning performance.

To achieve appreciable improvement in acid dye uptake, the tertiary amino-nitrogen polyamine component of the reaction mixture should constitute at least 1 mole percent of the total polyamine reactants in the reaction mixture. On the other hand, the tertiary amino-nitrogen polyamine may constitute the entire polyamine component in the reaction mixture.

The following examples wherein all proportions are by weight unless otherwise stated, illustrate specific embodiments of the invention.

*Example I*

Stoichiometrically equivalent quantities of 2-dimethylaminomethyl-5-methyl-1,6-hexanediamine (1.827 g.) and diphenyl terephthalate (3.105 g.) are placed in a reactor and sealed under vacuum. The charge is then heated at 220° C. for one hour. The reactor is then cooled, opened, and the charge heated at 285° C. under nitrogen for one hour. The pressure is thereafter reduced to 1 mm. and heating is continued for an additional 1.5 hours. The resulting polymer is tough and readily spinnable at temperatures above 245° C. As indicated by nitrogen analysis, at least two-thirds of the tertiary amino-nitrogen containing side chains are retained in the polymer.

*Example II*

A pressure reactor is charged with 2.115 g. of 2-dimethylaminomethyl-5-methyl - 1,6 - hexanediamine and 1.651 g. of adipic acid. The reactor is closed under vacuum and the charge heated for one hour at 220° C. After cooling, the reactor is opened and the charge heated at 255° C. for one hour under nitrogen. Thereafter, the pressure is reduced to 1 mm. and heating continued at 255° C. for an additional 1.5 hours. The resulting polymer is tough and becomes plastic at 85° C.

*Example III*

A mixture of 0.512 g. of 2-dimethylaminomethyl-5-methyl-1,6-hexanediamine, 0.400 g. of adipic acid, and 17.3 g. of hexamethyleneadipamide is sealed in a reactor and the charge heated for one hour at 220° C. The reactor is then opened and the charge heated under nitrogen at 295° C. for an additional hour. The resulting polymer has an inherent viscosity in the range of 0.90 to 1.00 when measured at 0.5% concentration in m-cresol at 25° C., and softens at 245° C. This polymer has an amine end group count in the range of 210 to 230×10⁻⁶ equivalents per gram and can be spun mechanically to give a yarn which is orientable by drawing. This yarn has been found to exhaust a dye bath, containing 1.5% (based on fiber weight) of a blue acid dyestuff (Color Index No. 502), rapidly and provides a deeply dyed product which has satisfactory light and wash-fastness. A yarn prepared from unmodified polyhexamethyleneadipamide under similar conditions takes up this dye relatively slowly and incompletely.

*Example IV*

A pressure reactor is charged with 0.482 g. of 2-dimethylaminomethyl - 5 - methyl - 1,6 - hexanediamine, 0.378 g. adipic acid, 42.2 g. of hexamethylenediammonium adipate, and 20 ml. of water. The reactor is flushed with nitrogen, sealed, and heated to 200° C. The charge is maintained at 200° C. for one hour. The pressure is then slowly reduced while raising the internal temperature to 275° C. This process requires one hour. The charge is heated at 275° C. for three hours. The polyamide thus obtained has an inherent viscosity in the range of 0.90 to 1, measured at 0.5% concentration in m-cresol at 25° C. and an amine end count in the range of 100 to $110 \times 10^{-6}$ equivalents per gram. This polyamide is readily spun mechanically to yarn which readily takes up acid dyestuffs.

The 2 - dimethylaminomethyl - 5 - methyl - 1,6 - hexanediamine used in the above examples was obtained by adding dimethylamine to alpha-methylene-delta-methyladiponitrile, prepared as described in U. S. Patent 2,566,203. The addition is effected as follows:

To a mixture of alpha-methylene-delta-methyladiponitrile (134 g., 1 mole) and a 33% aqueous solution of dimethylamine (272 g., 2 moles) is added 200 cc. of dioxan to give a clear solution. This mixture is warmed for 30 minutes on a steam bath and then distilled. After removal of a foreshot, there is obtained 150 g. (84%) of the adduct, B. P. 152–156° C./4 mm., $n_D^{25}$ 1.4519.

The above adduct (89.5 g., 0.5 mole) is transferred to a pressure reactor and hydrogenated in liquid ammonia over alloy-skeleton cobalt at 120° C. and 2500 lb./sq. in. pressure. Distillation of the product gives 75.5 g. (87%) of 2-dimethylaminomethyl-5-methyl-1,6-hexanediamine, B. P. 116° C./4 mm., $n_D^{25}$ 1.4688, N. E. 62.6.

*Example V*

Example IV is repeated using 2-morpholinomethyl-5-methyl-1,6-hexanediamine in place of 2-dimethylaminomethyl-5-methyl-1,6-hexanediamine in amount sufficient to provide 1.5% of the total amino constituent in the polymer. This polyamide has an amine group end count in the range of 85 to $95 \times 10^{-6}$ equivalents per gram. Yarn prepared by melt-spinning is strong (4.0 g./denier) and exhibits excellent dye receptivity, coupled with satisfactory wash- and light-fastness. Yarn prepared under comparable conditions from unmodified polyhexamethyleneadipamide does not accept acid dyestuffs to the same degree. Analysis has indicated that the comparable unmodified polyamide has an amine end group count of approximately $45 \times 10^{-6}$ equivalents per gram.

The 2-morpholinomethyl-5-methyl-1,6-hexanediamine was prepared by adding morpholine to 1-alpha-methylene-delta-methyladiponitrile, prepared as described in U. S. Patent 2,566,203 as follows:

A mixture of alpha-methylene-delta-methyladiponitrile (67 g., 0.50 mole), 45 g. of morpholine, and 0.1 g. sodium methoxide, is refluxed for one hour at 160° C. and then cooled, diluted with ether, and extracted with 10% hydrochloric acid. The acid extract is made alkaline with sodium hydroxide, extracted with ether, and the ether removed to give 21 g. of crude product. This is distilled to give 13.5 g. (12.3%) of alpha-morpholinomethyl-delta-methyladiponitrile, boiling point 197° C./5 mm., $n_D^{25}$ 1.4740. This product is then hydrogenated as described in connection with the preparation of 2-dimethylamino-methyl-5-methyl-1,6-hexanediamine, to give an 87% yield of 2 - morpholinomethyl - 5 - methyl - 1,6 - hexanediamine, boiling at 169° C./6 mm., $n$ 1.4883. Analysis shows the compound to contain 18.21% N. Theory for $C_{12}H_{27}ON_3$ is 18.4.

It will be understood the above examples are merely illustrative and that the present invention broadly comprises polyamides formed by the condensation polymerization of a polyamide-forming composition comprising a tertiary amino-nitrogen containing compound as hereinbefore characterized, and the process of preparing such polyamides by heating under condensation reaction conditions a polyamide-forming composition comprising a dibasic carboxylic acid and at least 1 mole percent of the total polyamine reactants of such tertiary amino-nitrogen containing compound.

The polyamides of this invention can be prepared in the presence or absence of a solvent. When interpolyamides are being prepared, employing a mixture of polyamines, one of which is easily volatile, it is desirable to carry out at least the initial stage of the reaction in a closed reactor or under reflux to prevent loss of reactants.

These polyamides are conveniently prepared in an open reactor equipped with a reflux condenser which permits the water or other by-product to escape but not the reactants or solvent. During the later stages of the reaction it is often desirable to decrease the pressure in order to complete the reaction and, if desired, to distill off the solvent. The polyamides may be freed of solvent by precipitation methods, if desired. Especially useful solvents are phenols, cresols, and xylenols. Instead of using solvents, the polyamides can also be made by sealing the reactants, or a salt of the diamine component, if any, and dibasic acid, in a pressure reactor, either evacuated or filled with purified nitrogen, and heating until the partially made polyamide is obtained, and finishing the poly-condensation by heating under vacuum.

The polycondensation is preferably carried out in an inert atmosphere. Anti-oxidants can be added to the reaction mixture, if desired and/or needed. Although it is generally unnecessary to add a catalyst, inorganic materials of alkaline reaction, e. g., oxides and carbonates, and acidic materials, e. g., halogen salts of polyvalent metals, for example, aluminum and tin chlorides, etc., are often helpful.

In the preparation of the polyamides of this invention, there may be used any dicarboxylic acid or amide-forming derivative thereof, such as, the ester or anhydride; or any amino carboxylic acid or amide-forming derivative thereof, such as the ester or lactam of such acid. The preferred dicarboxylic acids are those having at least 4 and not more than 12 carbons between the carboxyl groups. Examples of such dibasic acids are adipic, suberic, sebacic, isophthalic and terephthalic acids, and their esters and anhydrides. In place of these or in conjunction therewith, there can be used amino acids and their corresponding lactams. Examples of such amino acids are omega-aminocaproic acid and caprolactam.

Critical in the formation of these new polyamides is the use of a 2-tertiary-aminomethyl-5-methyl-1,6-hexanediamine. The two remaining valences of the tertiary amino-nitrogen can be variously satisfied. Thus, they can be satisfied by monovalent organic radicals or they can be satisfied by a divalent radical whose two valences emanate from two separate atoms, thereby forming a cyclic system with the tertiary amino-nitrogen. Included among the more suitable monovalent organic radicals are alkyl radicals of up to 12 carbons in chain length and aliphatic radicals containing oxygen, sulfur, or nitrogen in the chain in addition to carbon.

The preferred tertiary amino-nitrogen containing compounds are those in which each of the two valences of the tertiary amino-nitrogen is satisfied with an alkyl radical, especially a lower alkyl radical, i. e., alkyl radicals of less than 6 carbon atoms. Particularly preferred are those in which the alkyl radical is methyl. In the group of divalent radicals, the preferred are those which form with the tertiary amino-nitrogen 5 and 6 membered ring systems. These rings can contain only carbon and nitrogen or can contain carbon, nitrogen and oxygen, or carbon, nitrogen and sulfur.

These preferred tertiary amino-nitrogen containing compounds may be represented by the formula

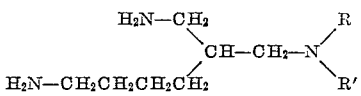

wherein R and R' taken individually each represents a monovalent organic radical, preferably a lower alkyl radical of less than 6 carbons, e. g., methyl, and taken together represent a divalent cyclic radical, preferably 5 and 6 membered ring systems including the tertiary amino-nitrogen.

Specific tertiary amino-nitrogen containing compounds well adapted for use in preparing the instant polyamides are 2-dipropylaminomethyl-5-methyl - 1,6-hexanediamine, 2-dihexylaminomethyl-5-methyl - 1,6-hexanediamine, 2-dioctylaminomethyl - 5 - methyl-1,6-hexanediamine, 2-didodecylaminomethyl-5-methyl-1,6-hexanediamine, 2-methylethoxyethylaminomethyl - 5-methyl - 1,6 - hexanediamine, 2-piperidinomethyl - 5 - methyl - 1,6-hexanediamine, 2(2-methylpiperidino)methyl - 5-methyl - 1,6 - hexanediamine, and N-methylpiperazinomethyl-5-methyl - 1,6 - hexanediamine.

The above tertiary amino-nitrogen containing compounds can be prepared by adding the appropriate secondary amine to alpha-methylene-delta-methyladiponitrile (methacrylonitrile dimer), followed by reduction of the nitrile to amino groups.

In the preparation of the polyamides of this invention, the tertiary amino-nitrogen containing polyamine can be the sole polyamide-forming nitrogen-containing component in the reaction mixture, but preferably it is used in conjunction with other polyamide-forming polyamines to impart improved dye receptivity to the resulting polyamide. In such interpolyamides the tertiary amino-nitrogen containing polyamine should constitute at least 1 mol percent of the total amine content of the reaction mixture. Suitable amines which can be used in conjunction with the tertiary amino-nitrogen containing polyamines, are 1,4-diaminobutane, 1,5-diaminopentane, 1,6-diaminohexane, 1,8-diaminooctane, and the like amines well known for use in preparation of fiber forming polyamides of the nylon type. Also, glycols can be included in the polyamide-forming composition to give polyamide-polyester products.

An outstanding property of the instant polyamides is their improved affinity for acid dye-stuffs as compared to heretofore known polyamides. This property is combined with good thermal stability and wash- and light-fastness of the dyed products. These polyamides are highly advantageous for conversion into films, fibers, filaments, and assorted articles where polyamides have been used heretofore and it is desirable to dye them.

As many apparently widely different embodiments of this invention may be made without departing from the spirit and scope thereof, it is to be understood that the invention is not limited to the specific embodiments thereof except as defined in the appended claims.

The invention claimed is:
1. A polyamide formed by the condensation polymerization of a polyamide-forming composition comprising a dibasic carboxylic acid and a polyamine, at least 1 mole percent of the total polyamine reactants of said polyamide-forming composition consisting of a 2-tertiary-aminomethyl-5-methyl-1,6-hexanediamine.

2. A polyamide as set forth in claim 1 wherein said dibasic carboxylic acid has from 4 to 12 carbons, inclusive, between the carboxyl groups.

3. A polyamide as set forth in claim 1 wherein said dibasic carboxylic acid is adipic acid.

4. A polyamide formed by the condensation polymerization of a polyamide-forming composition comprising adipic acid and a polyamine, at least 1 mole percent of the total polyamine reactants of said polyamide-forming composition consisting of 2-dimethylaminomethyl-5-methyl-1,6-hexanediamine.

5. Process of preparing a polyamide which comprises heating under condensation reaction conditions a polyamide-forming composition comprising a dibasic carboxylic acid and a polyamine, at least 1 mole percent of the total polyamine reactants of said polyamide-forming composition consisting of a 2-tertiary-aminomethyl-5-methyl-1,6-hexanediamine.

6. Process as set forth in claim 5 wherein said 2-tertiary-aminomethyl-5-methyl-1,6-hexanediamine is a 2-dialkyl-aminomethyl-5-methyl-1,6-hexanediane in which said alkyl radicals are lower alkyl radicals.

7. Process as set forth in claim 6 wherein said dibasic carboxylic acid has from 4 to 12 carbons, inclusive, between the carboxyl groups.

8. A polyamide as set forth in claim 12 wherein said 2-tertiary-aminomethyl-5-methyl-1,6-hexanediamine is 2-morpholinomethyl-5-methyl-1,6-hexanediamine.

9. A polyamide as set forth in claim 1 wherein said 2-tertiary-aminomethyl-5-methyl-1,6-hexanediamine is 2-morpholinomethyl-5-methyl-1,6-hexanediamine.

10. A polyamide formed by the condensation polymerization of a polyamide-forming composition comprising adipic acid and a polyamine, at least 1 mole percent of the total polyamine reactants of said polyamide-forming composition consisting of 2-morpholine-methyl-5-methyl-1,6-hexanediamine.

11. A condensation polymer of 2-tertiary-aminomethyl-5-methyl-1,6-hexanediamine and a dibasic carboxylic acid having 4 to 12 carbons between the two carboxyl groups.

12. A condensation polymer of polyamines comprising at least 1 mole percent of 2-tertiary-aminomethyl-5-methyl-1,6-hexanediamine and a dibasic carboxylic acid having 4 to 12 carbons between the two carboxyl groups.

13. A condensation polymer of 2-dialkylaminomethyl-5-methyl-1,6-hexanediamine and a dibasic carboxylic acid having 4 to 12 carbons between the two carboxyl groups.

14. A condensation polymer as set forth in claim 13 wherein the alkyl radicals of said 2-dialkylaminomethyl-5-methyl-1,6-hexanediamine are lower alkyl radicals.

15. A condensation polymer of 2-dimethylaminomethyl-5-methyl-1,6-hexanediamine and a dibasic carboxylic acid having 4 to 12 carbons between the two carboxyl groups.

References Cited in the file of this patent
UNITED STATES PATENTS

| | | |
|---|---|---|
| 2,176,074 | Jacobson | Oct. 17, 1939 |
| 2,396,275 | Kirby | Mar. 12, 1946 |
| 2,532,277 | Castle | Dec. 5, 1950 |

FOREIGN PATENTS

| | | |
|---|---|---|
| 882,841 | France | Mar. 8, 1943 |